United States Patent [19]

Kautz et al.

[11] Patent Number: 4,834,686
[45] Date of Patent: May 30, 1989

[54] RAIL MAPPING METHOD AND APPARATUS

[75] Inventors: Allan D. Kautz, Naperville; Janice L. Wichmann, Park Ridge, both of Ill.

[73] Assignee: Zenith Electronics Corporation, Glenview, Ill.

[21] Appl. No.: 138,994

[22] Filed: Dec. 29, 1987

[51] Int. Cl.[4] .............. B23K 26/04; B23K 26/10; G05B 19/35
[52] U.S. Cl. ............................ 445/30; 318/640; 318/573; 318/574; 901/42; 219/121.64; 219/121.79
[58] Field of Search .............. 228/102, 105, 7; 445/30; 356/2, 375, 376; 318/569, 572, 573, 574, 570, 640; 364/168, 169, 171; 901/42; 219/121.64, 121.79

[56] References Cited

U.S. PATENT DOCUMENTS

| | | | |
|---|---|---|---|
| 4,568,816 | 2/1986 | Casler | 901/42 X |
| 4,658,193 | 4/1987 | Low | 318/640 X |
| 4,695,761 | 9/1987 | Fendley | 313/407 |
| 4,697,979 | 10/1987 | Nakashima et al. | 901/3 X |
| 4,712,970 | 12/1987 | Nakamura et al. | 901/3 X |

FOREIGN PATENT DOCUMENTS 221672 12/1983 Japan .................... 901/42

OTHER PUBLICATIONS

*Welding Engineers*, Aug. 1970, pp. 42-44.

*Primary Examiner*—Kenneth J. Ramsey

[57] ABSTRACT

This disclosure describes a method and associated apparatus, in the manufacture of flat tension mask cathode ray tubes, for detecting the edges of a mask receiving surface in a plane, identifying its coordinates and subsequently delineating the path of an attachment device for permanently affixing a tensed foil shadow mask to the mask receiving surface of a mask support structure.

9 Claims, 5 Drawing Sheets

RAIL MAPPING METHOD AND APPARATUS

BACKGROUND OF THE INVENTION

1. Field of the Invention

This invention applies to assembling parts in the manufacture of flat tension mask color cathode ray tubes. The invention provides method and means for mapping the path of and positioning an attachment device for affixing a thin tensed foil shadow mask to the mask receiving surface of a mask support structure.

In particular the invention relates to a portion of the process steps employed in the manufacture of the front assembly of a flat tension mask color cathode ray tube. A front assembly includes a glass front panel, planar on one side defined as the inner surface of the glass front panel, a support structure affixed to the inner surface of the panel and a tensed foil shadow mask permanently attached to the support structure with proper registration relative to the color emitting phosphors, applied to the inner surface within the boundaries imposed by the support structure perimeter. Such a front assembly is described in U.S. Pat. No. 4,686,416.

2. Definitions

Certain definitions of terms and phrases used in this disclosure add to the clarity of the description of the invention.

Tube: The term "tube" in this disclosure means a flat tension mask cathode ray tube such as that used as a color television receiver screen or as a color computer monitor screen.

Panel: The front portion of the tube which functions as the viewing screen is a flat glass plate called the "panel".

Mask: An essential part of a tube is a thin metal shadow mask placed close to and behind the inner surface of the panel. In the preferred embodiment of this disclosure, the shadow mask is described as being made of steel and as being permanently affixed to a support structure by means of laser welding.

Support Structure and Rail: For proper functioning of a cathode ray tube, the mask is permanently installed, with proper registration, in a plane fixed at a specified distance from the inner surface of the panel. This specified distance is commonly called the "Q" spacing of the tube and is related to electrical and mechanical geometry of the tube. For the purpose of illustration, the Q spacing of a typical 14" diagonal screen flat tension mask cathode ray tube is approximately 0.290". This dimension is used as the specified distance in the description of the preferred embodiment. The support structure may be part of the panel or made of separate elements attached to the panel. In this document, the metal rectangular structure is called the "support structure". Any one side of the support structure is called a "rail".

Land and Mask Receiving Surface: In preparation for welding, the top surface of the support structure is ground flat. The ground surface of the support structure to which the mask is welded is called the "mask receiving surface" or the "land".

Inner and Outer Surfaces: The surface to which the grill pattern, the phosphor materials, the support structure and the mask are attached and the surface which is ultimately sealed inside the tube is called the "inner surface". The "outer surface" is exposed to view and to the touch after final assembly of the tube.

Mapping: The total process of detecting the position of the edges of the mask receiving surface on the support structure, recording its coordinates and computing the path to be followed by the laser welding head is called "mapping".

3. Reference to Prior Art:

There is no known prior art related to mapping the coordinates of a path to be followed by an attachment device for the purpose of affixing a tensed foil shadow mask, called a mask, to the support structure of a flat tension mask cathode ray tube.

4. Problems in the Manufacture of Fixed Mask Tubes:

A reason for rigid and permanent attachment of the mask to the support structure of a tube is to maintain mechanical tension on the mask so it retains its shape and exact registration with the color emitting phosphors deposited on the inner surface of the panel during normal operation of the tube.

What follows is a number of the problems addressed and solved by the invention:

A. Unpredictability of Support Structure Position

The support structure is made of a 28% chromium-iron alloy commonly known as "Carpenter Glass Sealing 27". Each of four rails is longitudinally formed, typically in a "V" shape, from sheet material (0.024" thick, as an example). The four rails are assembled to form a rectangle. Manufacturing variances contribute to deviations from an ideal rectangle. Glass frit, used as a glass to metal solder, is applied to both the rectangular support structure and to the surface of the panel in a rectangular pattern. The support structure is placed on the panel and the parts are fired in an oven for a period of time to bond the metal support structure permanently to the panel. Experience has shown that, even when great care is taken, it is difficult to bond the support structure to the panel within close tolerances.

B. Variable Width and Height of the Mask Receiving Surface

The available and variable width of the mask receiving surface places constraints on the attachment process. The mask must be precisely installed relative to the inner surface of the panel. The plane of the mask must be parallel to the plane of the inner surface, and it must be a precise specified distance from the inner surface. Most importantly, it must be registered with the color emitting phosphor dots on the panel in exactly the same way it was registered while the phosphors were being applied.

Variability in the height of the unfinished support structure is caused by the manufacturing processes used to form the metal parts and by the small variances in the fritting process. Height of the support structure is controlled by grinding the narrow edge of the rails to produce a mask receiving surface plane a specified distance from the inner surface of the panel.

The grinding process produces a land on the support structure typically 0.060" in width which, in practice, can vary from 0.030" to 0.100". In the process of affixing the mask to the mask receiving surface, a large number of welds, each approximately 0.010" diameter, are placed at intervals of approximately 0.020". For proper attachment of the mask to the support structure, all welds must be placed between the edges of the mask receiving surface.

The land is sufficiently wide to accept welds typically 0.010" diameter, but the unpredictability of the position of the rails introduces the possibility that the welds cannot be placed entirely on the land unless the laser welding head is positioned precisely in relation to a known position of the land.

C. Accessibility of the Path

Fundamental to the art of manufacturing flat tension mask tubes is the requirement that the mask be permanently attached to the panel in exactly the same relative position maintained during all other processes used to make the tube. Further, the requirements of the finished tube demand that the mask be very thin (0.001" thick, for example) and that it be absolutely flat. To assure flatness during assembly and during its normal operation where it encounters significant continuous temperature changes, the mask is retained under tension in two directions throughout the entire tube manufacturing process. This is achieved by clamping the mask in a sturdy but movable frame. During all processes, registration of the mask relative to the panel is maintained by means of ball and groove mechanical indexing devices that repeatedly reproduce proper registration as the separate parts are handled.

This same rigid frame and locating means are used to position the mask during the welding process. When in position for welding, the mask and the frame cause the welding path to be hidden from view and inaccessible to any type of mechanical, optical or visually controlled follower system.

By necessity, the welding path must be defined on the basis of measurements made before the mask is placed in its final position.

OBJECTIVES AND ADVANTAGES OF THE INVENTION

The primary object is to provide method and means for locating a mask receiving surface within a plane with sufficient accuracy (within plus or minus 0.002", for example) to permit delineation of a path to be followed by a laser welding head to permanently affix a mask to the mask receiving surface of the support structure of a flat tension mask cathode ray tube.

A second object is to provide method and means for mapping the true position of the mask receiving surface of the support structure of a tube.

Another object is to provide method and means for computing the coordinates of a path, commonly referred to as the x-y coordinates, on the mask receiving surface of the support structure of a tube wherein all points on the computed path fall sufficiently between the edges of the mask receiving surface to permit production of welds that fall entirely within the edges of the mask receiving surface.

A further object is to provide method and means for computer controlled automatic positioning of a weld head along the computed welding path on the mask receiving surface of the support structure.

An additional object is to provide method and means for accepting or rejecting any mask receiving surface on the basis of tolerances specified for its proper location on the panel and tolerances specified for minimum and maximum width of the land.

The advantage of the invention is that it solves all of the aforementioned problems related to manufacturing processes and it provides a fast and efficient means for welding a mask to the support structure of a flat tension mask cathode ray tube.

BRIEF DESCRIPTION OF THE DRAWINGS

Seven drawings are sufficient to explain the invention.

DESCRIPTION OF THE PREFERRED EMBODIMENT

Geometry of the Panel Assembly

Figure 1:
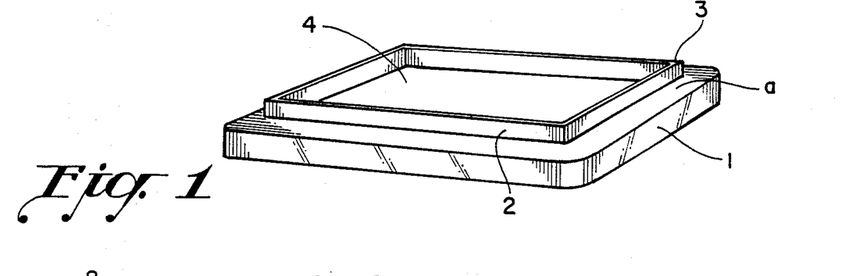
FIGS. 1–1d show a panel with support structure and illustrates mechanical details of the panel assembly. Typical distortions encountered in manufacturing operations are illustrated.

The panel 1 with its support structure 2 is shown in FIG. 1. The mask receiving surface 3, known as the land, is ground to a typical height of approximately 0.290" above the inner surface 4 of the panel. Prior to attachment of the mask, the area of the inner surface of the panel inside the support structure is coated with an aluminum film covering the black grille and the color emitting phosphors. This is in contrast to the portion of the inner surface 4 shown at a where the inner surface is uncoated. The significance of the aluminum coating to the nature of the invention will become evident in a later part of this disclosure. The panel 1 is a glass plate, typically ¼" thick, which is rigid and strong relative to the more delicate nature of the support structure 2.

Figure 1A:
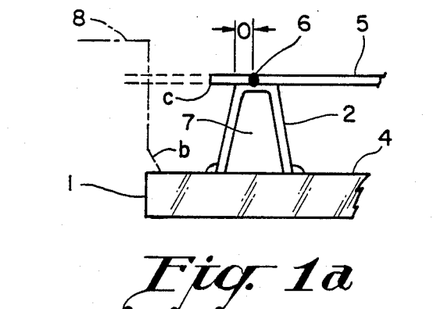

FIG. 1a illustrates details related to the mask 5 and its attachment to the support structure 2 by means of the weld 6. The support structure is attached to the panel 1 by firing the frit material 7 at an elevated temperature for approximately 2 hours. Experience with production practices has determined that the weld 6 should be offset approximately 0.020" from the outer edge of the support structure 2 as indicated by the distance o. Prior to and during the welding operation, the mask is retained in a tensed condition by the rigid frame 8.

The mask 5 is registered relative to the inner surface 4 of the panel 1 mask by a means of a ball and groove interlocking mechanism, not part of this invention, suggested at b. It is evident, as shown by the dotted lines that the rail of the support structure 2 is obscured from view and is inaccessible to any direct position detection means while the welding process is being executed.

After welding is completed, another pass of the laser beam with an additional offset to a position indicated at c (approximately 0.035" from the outer edge of the support structure), is made about the support structure to cut the mask 5 from the rigid frame 8.

Figure 1B:
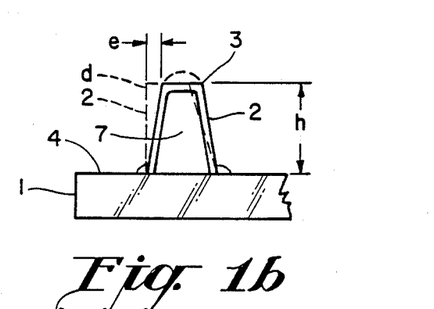

More details related to the rails of the support structure are shown in FIG. 1b. In the raw state, the rail of the support structure 2 has a rounded surface as suggested by the dotted lines. To achieve a precise and uniform specified height of approximately 0.290" from the inner surface 4, as indicated by h, the support structure undergoes a grinding operation (not part of this invention) to produce a land 3 in a plane parallel to the plane of the inner surface 4. The land has a smooth and uniform finish to facilitate welding. Further, as will be seen to be important, the finish of the land is bright which helps to distinguish it from its background.

At d in FIG. 1b, a typical distortion of the support structure of unpredictable magnitude e is illustrated. In the formation of the parts of the support structure and during its fastening to the panel during the fritting processes it is not unusual to experience unpredictable shifts in the position of the support structure 2 because of lateral shifts, rotations of the rails or stresses relieved in the materials during the heat treatment processes. Uncontrollable distortions make it impossible to predict the precise final location of the support structure at the time of the welding operation.

Figure 1C:
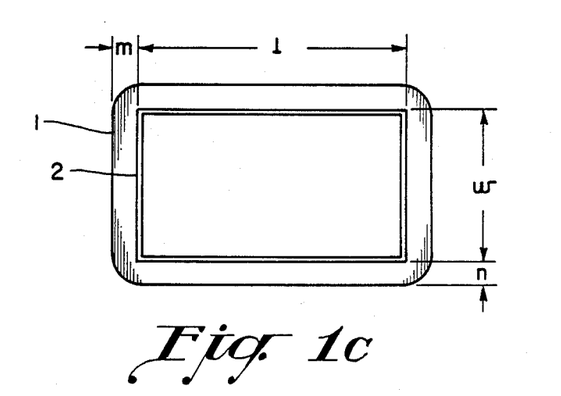
Figure 1D:
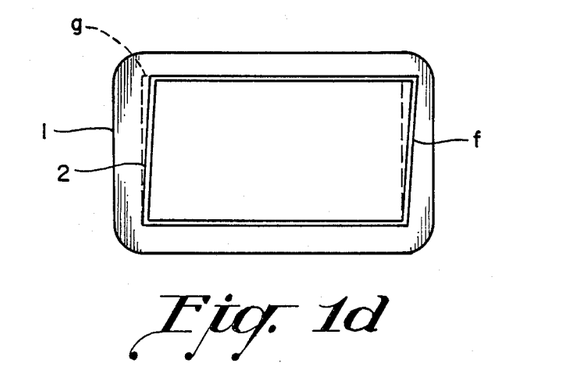

FIG. 1c shows the desired relationship of the support structure 2 to the panel 1. All rails are parallel to the edges of the panel 1 and dimensions w, 1, m and n are within a specified tolerance of plus or minus 0.025". In FIG. 1d, an out-of-tolerance shift of a corner is suggested at g. Lateral shifts of the rails, as suggested at f, mean that the rails may not always be straight. These and other types of uncontrollable distortions indicate that the final shape of the support structure 2 and its position relative to the edges of the panel 1 is unpredictable.

Measurement Method

Figure 2:
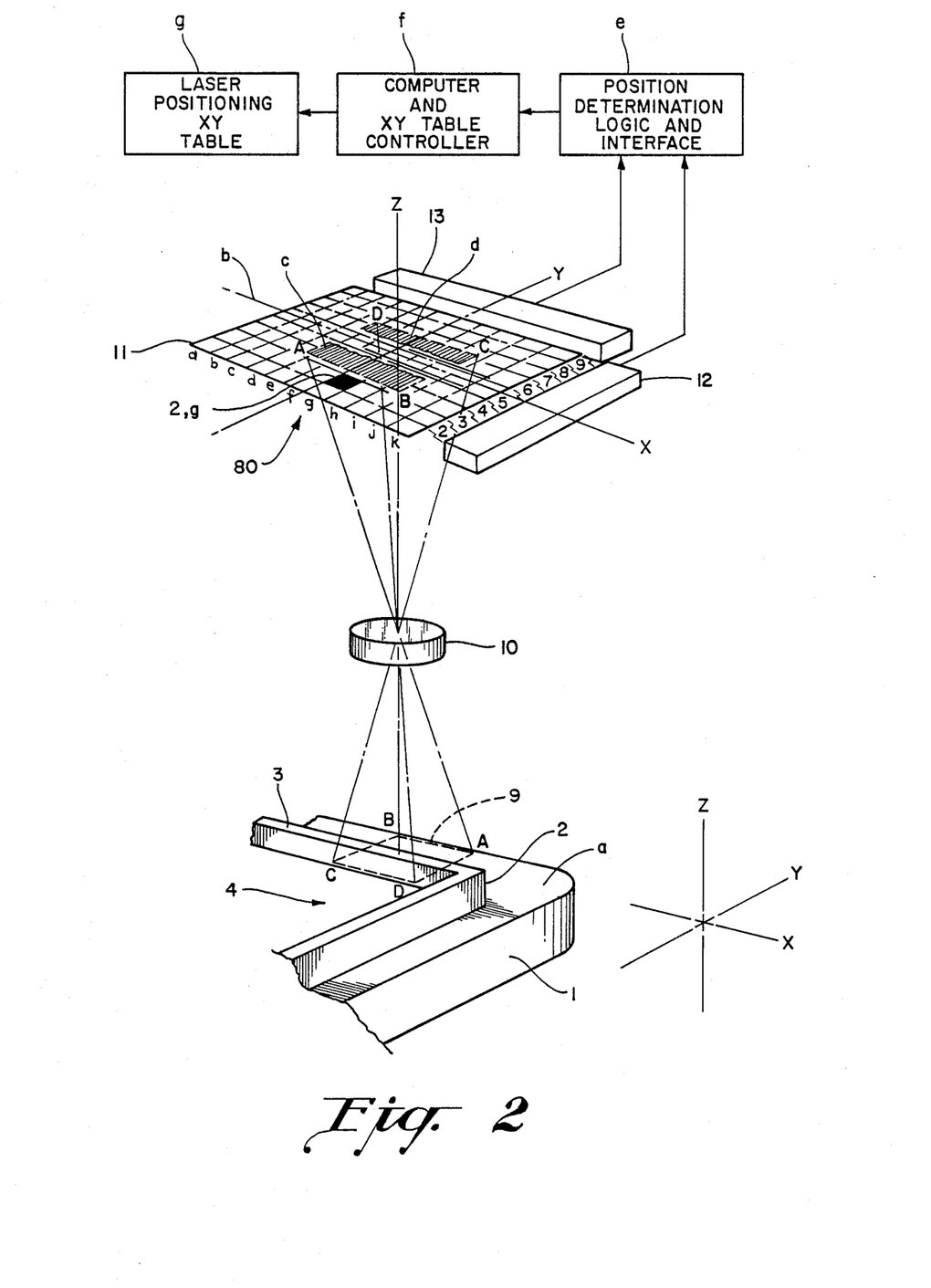
FIG. 2 is a conceptual rendition of an optical recognition device, more specifically a video camera, illustrating a means for recognizing a mask receiving surface and comparing its position to a specified acceptable position. Schematically shown, is an interface computer system between the video camera and the xy positioner to illustrate the concept of determining the true position of a mask receiving surface and controlling an xy positioner.

FIG. 2 illustrates the concept of using a video camera 80 to locate and define the position of a portion of a rail of the support structure 2. Further, FIG. 2 indicates that the visually detected information is subsequently processed with computerized equipment e, f and g to reduce the video image to information used to move a laser welding head to the correct positions for welding a mask 5 to the support structure 2. An Allen-Bradley Company Model 2805 EXPERT Programmable Vision System is suitable equipment for measuring the location of the rails. This Allen-Bradley system maps images using a technique, known in the art of image recognition systems, called "contour extraction".

A contour is defined as a figure defined at the ends by the edges of the field-of-view 9 and the inner and outer edges of a rail land 3.

In the preferred embodiment of the invention, the pixel information processor is designed to determine the location of all edges of the mask receiving surface 3 within the field-of-view based on the contrast between surfaces divided by an edge. The edges are then connected to form a closed area or "contour". The decision making process is further enhanced by the pixel information processor evaluating the shape of the image as compared to image tolerances built into the system software.

First it is necessary that the support structure 2 be within the field-of-view 9 of the camera. This is not a serious limitation in that the field-of-view of a video camera is very large as compared to the size of a rail. The lower part of FIG. 2 shows a typical field-of-view relative to a small portion of one rail of the support structure 2. The points A, B, C and D mark the corners of the field-of-view.

Through a lens system 10, the image in the field-of-view 9 is projected to the photosensitive image plane 11 of the video camera 80. The image may or may not be reversed in the image plane depending on the design of the lens system 10 and the position of the image plane. The corresponding corners A, B, C and D of the field-of-view 9 are indicated in the image plane 11.

The image plane is depicted as being compartmentalized into a large number of discrete elements called pixels. One single pixel is, for the purpose of description, designated at location 2,g. Given a sufficient number of pixels, the precise location of an image relative to the image plane can be determined. If the precise position of the image plane is known relative to the XY plane of the land of the support structure 2, the position of the mask receiving surface 3 can be precisely defined.

While the exact means of collecting information in terms of pixels is not vitally important to the invention, whether it be a solid state video camera sensing voltages at discrete pixel elements or it be a vidicon camera using an electron beam to sense light intensity at specific points along a scan line, the end result is that the image is digitized with such accuracy that the position of the rail in the field-of-view 9 can be defined within plus or minus 0.002". An NEC Model 22A II/22P CCD solid state video camera is suitable for use in this invention.

The image of the field-of-view 9 in the image plane 11 of the video camera 80 is shown at c. The light area at b indicates the land 3 of the support structure 2 as compared to the dark area representing the inner surface 4.

No aluminum coating is applied to the inner surface 4 outside the rectangular support structure 2 as indicated at a; hence, its image indicated at c is always dark. The area of the inner surface 4 inside the support structure 2 and immediately adjacent to the inner edged of the rails, ideally, has no aluminum coating; therefore, the image at d should also be dark.

However, the area inside the support structure 2 including the area immediately adjacent to the inner edge of the rails can be coated with aluminum (because of production process variations). This has the effect of reducing the contrast between the shiny rail and its background (caused by aluminum near the edge of the rail) and introduces the possibility of extraneous contours being sensed, possibly caused by aluminized frit material 7 being within the camera field-of-view 9. The true rail contour must then be distinguished from several contours that may exist within the field of view.

For the purpose of illustration, the pixel state information is shown to be stored in terms of row and column information in memory buffers 12 and 13 such that the state of each pixel can be determined to be "light" or "dark". A light pixel is interpreted as being a point on a contour. A dark pixel is interpreted as being a background point.

It is clear to one skilled in the art of video recognition systems that the stored pixel information can be processed to establish within close limits the location of the edges of the mask receiving surface 3 and enable the preparation of computer instructions to operate an xy positioner for moving a laser welding head along the correct path for satisfactorily affixing a mask 5 to the mask receiving surface 3 of the support structure 2 of a tube.

The vision system looks at all the contours it detects by edge discrimination within the field-of-view 9 and it collects and stores them in a linear fashion (linear in the sense of scanning an xy plane) and stores the contour images in a queued stack so the contours on the "top" and the "bottom" of the stack represent the outermost contours detected. Using a computer algorithm, the first stored contour, representing the outer edge of the rail, is selected and is assumed to represent the rail contour. Tolerance limits are then applied to the computed centroid position of that contour and acceptance or rejection is decided. Acceptance and rejection is based on comparing the position of the centroid of the measured contour to the expected centroid position based on a compared to looking at all stored contours and attempting to apply tolerances to all of them in establishing acceptance or rejection. Although other algorithm techniques are possible, this method has proved to be suitable.

Essential to success in contour determination is a satisfactory method of illumination which can be determined only by empirical methods. Practical experience has evolved data for adjusting the apertures of the video cameras to enable coaxially mounted lights to optimize the illumination of the mask receiving surface 3 thereby maximizing reflection from the land and minimizing reflection from the background (the aluminized surface in particular).

Figure 3:
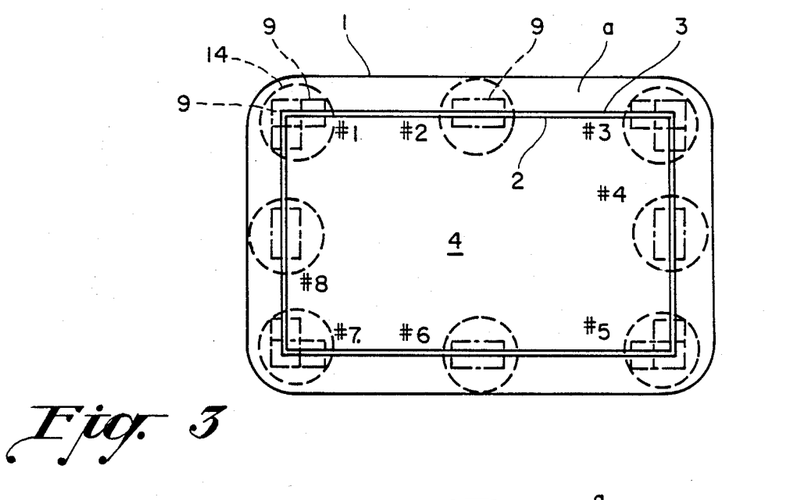
FIG. 3 schematically illustrates an array of eight video cameras arranged to detect twelve contours on the mask receiving surface of the support structure.

FIG. 3 shows that eight video cameras 80 can be used to measure the positions of twelve contours on the mask receiving surface 3 of the support structure 2. While, in theory, one camera can be used to define the twelve contours on the mask receiving surface 3, limitations in the state of the art of video recognition equipment dictate that success of the invention is better assured by using an array of eight cameras.

The even numbered cameras measure contours at the midpoint positions on each of the four rails of the support structure 2. Odd numbered cameras, focusing on the corners of the support structure rectangle, measure one location on each of two rails of the support structure 2.

The two fields-of-view 9 of the corner cameras are switched electronically in the logic of the vision system. The circles 14 represent apertures in a glare shield placed over the panel assembly at the time of measurement.

The purpose of the glare shield is to enhance the contrast between the shiny mask receiving surface 3 and the aluminized inner surface 4. In particular, the glare shield counteracts the bright reflective surface of the deposited aluminum coating on the inner surface 4 inside the support structure 2. Insufficient contrast inhibits the ability of the video system to discriminate between the contour of the land 3 and the inner surface 4.

Figure 4:
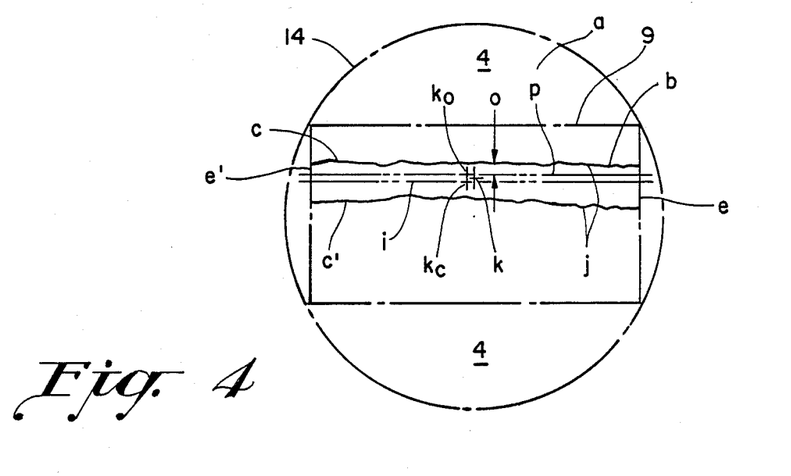
FIGS. 4 and 4a are views of acceptable and unacceptable mask receiving surfaces within the field-of-view of a video camera.

FIG. 4 shows expanded views of acceptable and unacceptable rail locations relative to the field-of-view 9 of one camera 80. The contour b being evaluated is bounded by the edges c and c' of the rail image and the ends of the field-of-view indicated as e and e'. Using these boundaries, the position of the centroid $k_c$ of the contour is calculated. On the basis of its position as compared to the expected centroid position K, the position of the rail is accepted or rejected.

To determine a point $k_o$ on the path to be followed by the laser welding head, the position of the outer edge of the rail, as indicated by c, is computed using the stored pixel information. At about the position of the computed centroid $k_c$ point $k_c$ is placed a distance o of approximately 0.020" from the outer edge of the rail. The line through the centroid is indicated at i.

Figure 4A:
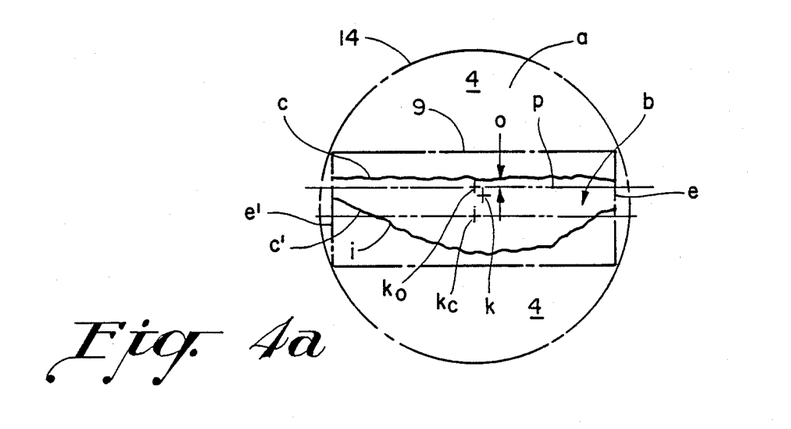

FIG. 4a illustrates a potentially unacceptable condition which might occur when the aluminum coating is deposited on the mask receiving surface 3 or too near the inner side of the rail of the support structure 2 resulting in ambiguous definition of a contour.

In FIG. 4a the position of the outer edge c of the mask receiving surface 3 is acceptable, but the image of the inner edge c' is ambiguous because the video recognition system cannot discriminate between the real edge and the apparent edge c'. In this example, the contour b bounded by the edges c and c' and the edges of the field-of-view e and e' results in the computation of a centroid $k_c$ considerably farther from the expected centroid K (than in the example shown in FIG. 4) thereby opening the possibility that the contour, and therefore, the position of the support structure 2 should be rejected. Again, if accepted, the point $k_c$ on the path to be followed by the laser welder is determined by placing a point at about the position of the centroid a distance o of approximately 0.020 inches from the outer edge c of the rail.

Ambiguity arises from insufficient contrast. The logic of the pixel information processor is designed to reject ambiguous images; and hence, incorrectly positioned mask receiving surfaces.

Figure 5:
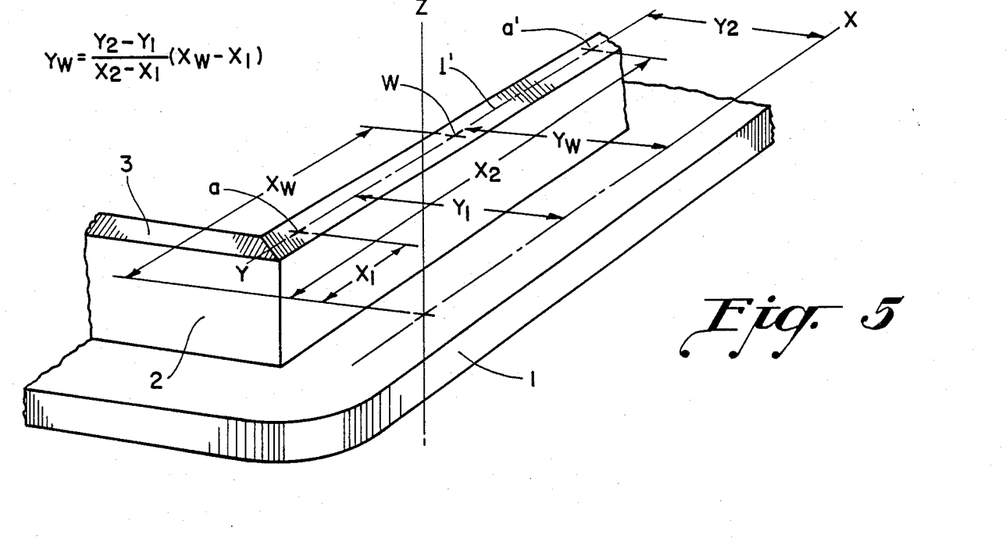
FIG. 5 illustrates a mathematical technique for delineating the path to be followed by the laser welding head.

FIG. 5 illustrates a mathematical concept used to convert pixel information to a path for guidance of the laser welding head. Using the visual sensing means and computing systems previously described, the coordinates $(x_1, Y_1)$ and $(x_2, y_2)$ of the two points a and a' are determined. These points are locations in the XY plane of the mask receiving surface 3 and ultimately the XY plane of the laser beam focused by the laser welding head.

With known coordinates, the equation (that of a straight line) is used to determine any point w represented by coordinates $(x_w, y_w)$. Those skilled in the art of programming numerically controlled machine tools are, therefore, capable of instructing a computer to position a laser beam along such a delineated path by providing proportional offset to the position of the laser beam as the beam progresses in the X direction along the line 1'. FIG. 5 shows one of eight line segments delineated by the mapping system. With eight cameras 80, twelve points can be defined permitting the delineation of eight line segments to be traced by the laser beam in the process of welding the mask 5 to the mask receiving surface 3 around the full perimeter of the support structure 2.

An Allen-Bradley Series 8200 CNC Control Unit is suitable for operating an xy positioner to accomplish the objects of this invention.

Calibration

The field-of-view 9 of each camera 80 is calibrated to the XY axes of the xy positioner by exposing each camera to the configuration of a master panel and support structure assembly of known dimensions. For each camera a scaling factor is automatically calculated relating the image plane of each camera 80 to the XY axes of the mask receiving surface 3. The software and set-up procedure for the cameras permits adjustment of numerous parameters important to the proper operation of the system such as origin offsets, skew, scaling factors, window sizes of the field-of-view, camera gain, thresholding, etc.

Calibration of the laser welding xy positioner station is performed by aligning the eight camera array with welds produced on a master panel using the xy table and laser welding head of the production system.

Figure 6:
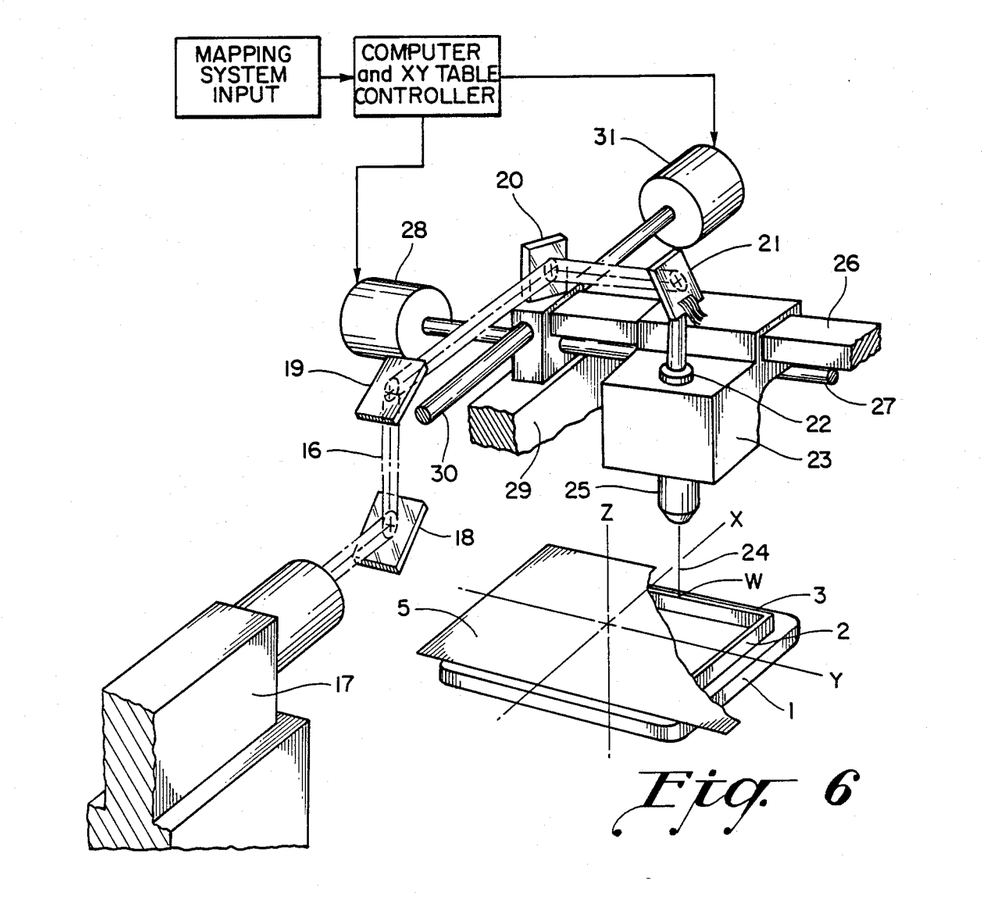
FIG. 6 is a schematic representation of a machine system for coordinating all functions for automatic mapping and welding of masks to mask receiving surfaces of flat tension cathode ray tubes.

FIG. 6 illustrates how the broad beam 16 of a stationary laser 17 such as a Spectra Physics Model 810 600 watt $CO_2$ laser is positioned to weld points and focus on a mask 5 at points on a path coincident with the land of the mask receiving surface 3 of the support structure 2 assembled to the panel 1.

Through a series of mirrors 18, 19, 20 and 21 the broad beam 16 is routed to the input 22 of a laser focusing head 23 resulting in a focused beam 24 being emitted from a lens system 25. Where the laser beam 24 impinges upon the mask 5 at point w, a weld is made.

While welds are being made at a rate of approximately 150 welds per second, the panel 1 with the support structure 2 and the mask 5 are held in a stationary position. The laser focusing head 23 is mounted in the Y axis slide 26 of an xy positioner. The Y axis slide 26 is moved by a screw 27 operated by the Y axis positioning motor 28. In a similar manner the Y axis slide 26 is moved transversely along the X axis slide 29 by a screw 30 operated by the X axis positioning motor 31. The stationary mirrors 18 and 19 (plus other stationary mirrors as required) direct the broad laser beam 16 along the X axis such that it is always in alignment with the moving mirror 20 mounted on the Y axis slide 26. Similarly, the mirror 21 affixed to the laser focusing head 23 is always in alignment with the laser beam reflected by mirror 20; hence, regardless of the position of the laser focusing head 23 in the XY plane, the laser beam originated by the laser 17 can be directed to any point in the XY plane of the mask receiving surface 3. The positioning motors 28 and 31 are operated in accordance with coordinates of the welding path mapped from measurements computed by the various components of the video camera vision system previously discussed.

Operation

Figure 7:
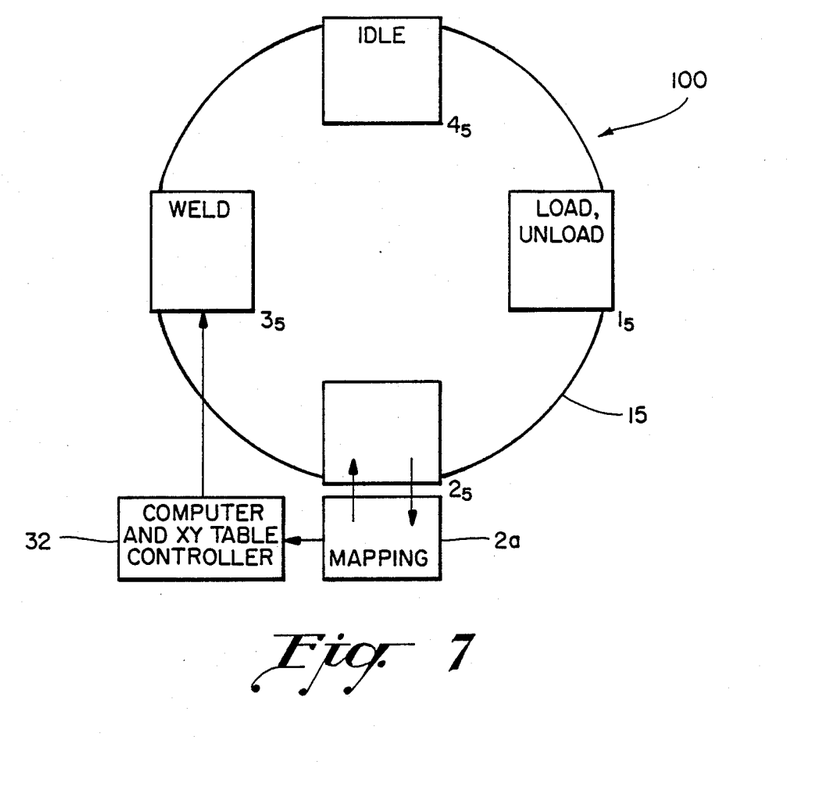
FIG. 7 illustrates how an xy positioning mechanism is used to focus the output of a stationary laser to a focused high energy laser beam at the point of welding.

FIG. 7 is a schematic representation of a machine 100 for determining the position of the mask receiving surface 3, calculating the path for the laser welding head 23 to follow and then executing the welding of the mask 5 to the support structure 2 in a computer controlled sequence. An indexing table 15 is equipped with four work stations. Station 1s is for loading the panel assembly (shown in FIG. 1) and the mask in its rigid support frame as suggested in FIG. 1a. This station 1s is also used to unload the welded mask and panel assembly and the empty rigid support frame 8 used to maintain tension on the mask 5 during all production processes.

The table 15 indexes to Station 2s where the panel assembly is automatically moved from the table 15 under an array of eight video cameras 80 rigidly attached to the base of the machine 100. It is at this position that the location of the support structure is mapped as previously described. After mapping, the panel assembly is automatically returned to its position on the machine table 15.

The table 15 next indexes to Station 3s for the welding operation. Here the rigid frame 8 holding the mask 5 and the panel assembly are brought together and locked in position relative to the correct XY axes referencing the coordinates to be used in moving the laser welding head over the course of the mask receiving surface 3. Once welding is complete, the table 15 indexes to Station 4s designated for future robot unloading. Finally the machine table 15 indexes to the original Station 1s and the entire process is repeated.

While particular embodiments of the invention have been shown and described, it will be obvious to those skilled in the art that changes and modifications may be made without departing from the invention in its broader aspects; and, therefore, the aim in the appended claims is to cover all such changes and modifications as fall within the true spirit and scope of the invention.

What is claimed is:

1. In the manufacture of a fixed tensed foil mask cathode ray tube which includes a glass front panel having a mask support structure on a planar inner surface thereof for receiving a foil mask, said support structure having a finished mask receiving surface, apparatus for detecting the position of said mask receiving surface on said support structure and for delineating a path to be traced by an attachment device for affixing a tensed foil shadow mask to said mask receiving surface, comprising:

means for detecting, within a plane, edges of said mask receiving surface to define the position of said edges on said mask receiving surface in said plane, wherein said means for detecting includes a plurality of video cameras disposed in a spaced manner about said mask support structure for simultaneous imaging of a plurality of points defining the positions of said edges on said mask receiving surface in said plane;

means for encoding coordinates of defined points on said edges of said mask receiving surface in said plane;

means for storing and processing the imaging of said plurality of points defining the positions of said edges on said mask receiving surface for computing a centroid of the contour of said imaging, wherein said contour is an area bounded by the edges of a field of view of said video cameras and the edges of said mask receiving surface;

means responsive to said coordinates for comparing the position of the centroid computed from the imaging of said plurality of points defining the positions of said edges of said mask receiving surface to predetermined dimensional limits for acceptance or rejection of said positions of said edges of said mask receiving surface within said plane;

means responsive to said coordinates of said defined points for computing coordinates of points on a path to be traced by said attachment device for affixing said mask to said mask receiving surface; and means responsive to said computed coordinates of said points on said path for effecting relative movement between said mask receiving surface and said attachment device to permit said mask to be affixed to said mask receiving surface.

2. In the manufacture of a fixed tensed foil mask cathode ray tube which includes a glass front panel having a mask support structure on a planar inner surface thereof for receiving a foil mask, said support structure having a finished mask receiving surface, apparatus for detecting the position of said mask receiving surface on said support structure and for delineating a path to be traced by an attachment device for affixing a tensed foil shadow mask to said mask receiving surface, comprising:

optical recognition means for detecting, within a plane, edges of said mask receiving surface to define the position of said edges on said mask receiving surface in said plane;

means responsive to said optical recognition means for encoding coordinates of defined points on said edges of said mask receiving surface in said plane;

means responsive to said coordinates for comparing the positions of said edges of said mask receiving surface to predetermined dimensional limits for acceptance or rejection of said position of said edges of said mask receiving surface within said plane;

means responsive to said coordinates of said defined points for computing coordinates of points on a path to be traced by said attachment device for affixing said mask to said mask receiving surface, wherein said path is offset a predetermined amount from an edge of said mask receiving surface; and positioning means responsive to said computed coordinates of said points on said path for effecting relative movement between said mask receiving surface and said attachment device to permit said mask to be affixed to said mask receiving surface, said positioning means including a machine work table for maintaining said mask receiving surface fixed in one of four positions, an XY positioning device on which is mounted a laser welding head, a series of mirrors for directing an unfocused beam of a stationary laser to an input of said laser welding head, and CNC computer controlled equipment for controlling said XY positioning device and causing a focused beam of said laser welding head to trace said path for affixing said mask to said mask receiving surface.

3. In the manufacture of a fixed tensed foil mask cathode ray tube which includes a glass front panel having a mask support structure on a planar inner surface thereof for receiving a foil mask, said support structure having a finished mask receiving surface, a method for detecting the position of said mask receiving surface on said support structure and for delineating a path to be traced by an attachment device for affixing a tensed foil shadow mask to said mask receiving surface, comprising:

detecting, within a plane, edges of said mask receiving surface to define the position of said edges on said mask receiving surface in said plane, including the steps of optically viewing a plurality of spaced locations by means of a plurality of video cameras about said mask support structure in simultaneously imaging a plurality of points defining the position of the edges of said mask receiving surface in said plane;

responsive to said detecting, encoding coordinates of defined points on said edges of said mask receiving surface in said plane;

storing and processing the imaging of said plurality of points defining the position of said edges on said mask receiving surface for computing a centroid of the contour of said imaging, wherein said contour is in an area bounded by the edges of a field of view of said video cameras and the edges of said mask receiving surface;

responsive to said coordinates, comparing the position of the centroid computed from the imaging of said plurality of points defining the positions of said edges of said mask receiving surface to predetermined dimensional limits for acceptance or rejection of said position of said edges of said mask receiving surface within said plane;

responsive to said coordinates of said defined points, computing coordinates of points on a path to be traced by said attachment device for affixing said mask to said mask receiving surface; and responsive to said computed coordinates of said points on said path, effecting relative movement between said mask receiving surface and said attachment device to permit said mask to be affixed to said mask receiving surface by maintaining said mask receiving surface fixed in one of a plurality of positions on a machine work table and in proximity to an XY positioning device on which is mounted a laser welding head, directing an unfocused beam of a stationary laser to an input of said laser welding head using a plurality of mirrors, and controlling the XY position of said laser welding head relative to said mask receiving surface in causing the focused beam of said laser welding head to trace said path for affixing said mask to said mask receiving surface.

4. In the manufacture of a fixed tensed foil mask cathode ray tube which includes a glass front panel having a mask support structure on a planar inner surface thereof for receiving a foil mask, said support structure having a finished mask receiving surface, a method for detecting the position of said mask receiving surface on said support structure and for delineating a path to be traced by an attachment device for affixing a tensed foil shadow mask to said mask receiving surface, comprising:

optically detecting, within a plane, edges of said mask receiving surface to define the position of said edges on said mask receiving surface in said plane, with said edges of said mask receiving surface being within the field-of-view of an image recognition optical system using eight solid state video cameras arrayed for simultaneous imaging of twelve contours of said mask receiving surface to define the position of twelve points on said edges of said mask receiving surface in said plane;

illuminating said twelve contour images in said plane of said mask receiving surface for enhancement of said twelve contour images to enable said eight video cameras to distinctly discriminate between said images of said mask receiving surface and background images comprising the inner surface of said glass front panel and production process anomalies;

responsive to said detecting, encoding coordinates of defined points on said edges of said mask receiving surface in said plane, including the steps of storing and processing images detected by said image recognition optical system to define sufficient points on said edges of said mask receiving surface in said plane for use by calculating means for computing coordinates of said points on said edges of said mask receiving surface to define the position of said edges of said mask receiving surface in said plane;

selecting first in queue of a stored image contour for each of said twelve contour images and processing said selected stored contour image to compute the centroid of said selected contour image, wherein said selected contour image is in an area bounded by the edges of the field-of-view of said solid state video camera used in said image recognition optical system and said edges of said mask receiving surface detected by said image recognition optical system;

responsive to said coordinates, comparing the computed centroid of said selected contour image to a preestablished acceptable position of said computed centroid for acceptance or rejection of said position of said edges of said mask receiving surface within said plane;

responsive to said coordinates of said defined points, computing coordinates of points on a path to be traced by said attachment device for affixing said mask to said mask receiving surface, wherein said path is offset a predetermined amount from one edge of said computed position of said edge of said mask receiving surface such that all points on said path on said mask receiving surface are between the two edges of said mask receiving surface and wherein a path is computed for the entire perimeter of said mask receiving surface; and responsive to said computed coordinates of said points on said path, effecting relative movement between said mask receiving surface and said attachment device to permit said mask to be affixed to said mask receiving surface by positioning said mask receiving surface within said plane using said computed coordinates of said points on said path relative to the position of said attachment device, wherein said glass front panel with said support structure with said mask receiving surface is fixed in one of a plurality of positions of a machine work table positioned in proximity to an XY positioning device on which is mounted a laser welding head wherein a series of mirrors direct an unfocused laser beam of a stationary laser to the input of said laser welding head and wherein said XY positioning device is displaced by CNC computer controlled equipment causing the focused beam of said laser welding head to trace said path such that all welds produced by said focused laser beam are placed between the two edges of said mask receiving surface.

5. In the manufacture of a fixed tensed foil mask cathode ray tube which includes a glass front panel having a mask support structure on a planar inner surface thereof for receiving a foil mask, wherein said support structure is in the general form of a closed rectangle defined by four right angle corners, and four side rails defining a finished mask receiving surface, apparatus for detecting the position of said mask receiving surface on said support structure and for delineating a path to be traced by an attachment device for affixing a tensed foil shadow mask to said mask receiving surface, comprising:

means for detecting, within a plane, edges of said mask receiving surface to define the position of said edges on said mask receiving surface in said plane, wherein said means for detecting includes eight video cameras disposed in a spaced manner about said mask support structure for simultaneously imaging twelve contours representing twelve locations on said mask receiving surface, wherein four of said video cameras are each focused on a respective corner of said support structure and four of said cameras are each focused on a respective one of said rails;

means for encoding coordinates of defined points on said edges of said mask receiving surface in said plane;

means for storing and processing the imaging of said twelve contours representing twelve locations on said mask receiving surface for computing a centroid of the contour of said imaging, wherein said contour is an area bounded by the edges of a field of view of said video cameras and the edges of said mask receiving surface;

means for receiving said coordinates for comparing the position of the centroid computed from the imaging of said plurality of points defining the positions of said edges of said mask receiving surface to predetermined dimensional limits for acceptance or rejection f said position of said edges of said mask receiving surface within said plane;

means responsive to said coordinates of said defined points for computing coordinates of points on a path to be traced by said attachment device for affixing said mask to said mask receiving surface; and means responsive to said computed coordinates of said points on said path for effecting relative movement between said mask receiving surface and said attachment device, to permit said mask to be affixed to said mask receiving surface.

6. In the manufacture of a fixed tensed foil mask cathode ray tube which includes a glass front panel having a mask support structure on a planar inner surface thereof for receiving a foil mask, said support structure having a finished mask receiving surface, apparatus for detecting the position of said mask receiving surface on said support structure and for delineating a path to be traced by an attachment device for affixing a tensed foil shadow mask to said mask receiving surface comprising:

means for detecting, within a plane, edges of said mask receiving surface, with said edges of said mask receiving surface being within the field-of-view of an image recognition optical system, to define the position of said edges on said mask receiving surface in said plane;

means for storing and processing images detected by said image recognition optical system to define sufficient points on said edges of said mask receiving surface in said plane for use by calculating means for computing coordinates of said points on said edges of said mask receiving surface to define the position of said edges of said mask receiving surface in said plane;

means for processing said stored images to compute the centroid of the contour of said images wherein said contour is an area bounded by the edges of the field-of-view of solid state video cameras used in said image recognition optical system and said edges of said mask receiving surface detected by said image recognition optical system;

means for comparing the position of said computed centroid to a pre-established acceptable position of said computed centroid for acceptance or rejection of said image of said mask receiving surface and said mask receiving surface as being in a usable position in said plane;

means for computing coordinates of points on said path to be traced by said attachment device for affixing said mask to said mask receiving surface wherein said path is offset a predetermined amount from one edge of said computed position of said edge of said mask receiving surface such that all points on said path on said mask receiving surface are between the two edges of said mask receiving surface and wherein said path is computed for the entire perimeter of said mask receiving surface; and means for positioning said mask receiving surface within said plane, using said computed coordinates of said points on said path relative to the position of said attachment device, such that said mask is affixed to said mask receiving surface wherein all joints made by said attachment device are placed between the two edges of said mask receiving surface.

7. In the manufacture of a fixed tensed foil mask cathode ray tube which includes a glass front panel having a mask support structure on a planar inner surface thereof for receiving a foil mask, said support having a finished mask receiving surface, apparatus for detecting the position of said mask receiving surface on said support structure and for delineating a path to be traced by an attachment device for affixing a tensed foil shadow mask to said mask receiving surface comprising:

means for detecting, within a plane, edges of said mask receiving surface, with said edges of said mask receiving surface being within the field-of-view of an image recognition optical system, to define the position of said edges on said mask receiving surface in said plane;

means for storing and processing images detected by said image recognition optical system to define sufficient points on said edges of said mask receiving surface in said plane for use by calculating means for computing coordinates of said points on said edges of said mask receiving surface to define the position of said edges of said mask receiving surface in said plane;

means for processing said stored images to compute the centroid of the contour of said images wherein said contour is an area bounded by the edges of the field-of-view of solid state video cameras used in said image recognition optical system and said edges of said mask receiving surface detected by said image recognition optical system;

means for comparing the position of said computed centroid to a pre-established acceptable position of said computed centroid for acceptance or rejection of said image of said mask receiving surface and said mask receiving surface as being in a usable position in said plane;

means for computing coordinates of points on said path to be traced by said attachment device for affixing said mask to said receiving surface wherein said path is offset a predetermined amount from one edge of said computed position of said edge of said mask receiving surface such that all points on said path on said mask receiving surface are between the two edges of said mask receiving surface and wherein said path is computed for the entire perimeter of said mask receiving surface; and means for positioning said mask receiving surface within said plane, using said computed coordinates of said points on said path relative to the position of said attachment device, such that said mask is affixed to said mask receiving surface by said attachment device, wherein said attachment device is a laser welder mounted on an XY position system such that CNC computer controlled equipment causes a focused beam of said laser welder to trace said path such that all welds produced by said focused laser beam are placed between the two edges of said mask receiving surface.

8. In the manufacture of a fixed tensed foil mask cathode ray tube which includes a glass front panel having a mask support structure on a planar inner surface thereof for receiving a foil mask, said support structure having a finished mask receiving surface, apparatus for detecting the position of said mask receiving surface on said support structure and for delineating a path to be traced by an attachment device for affixing a tensed foil shadow mask to said mask receiving surface comprising:

means for detecting, within a plane, edges of said mask receiving surface, with said edges of said mask receiving surface being within the field-of-view of an image recognition optical system using eight solid state video cameras arrayed for simultaneous imaging of twelve contours of said mask receiving surface to define the position of twelve points on said edges of said mask receiving surface in said plane;

means for illuminating said twelve image areas in said plane of said mask receiving surface for enhancement of said twelve contour images to enable said eight video cameras to distinctly discriminate between said images of said mask receiving surface and background images comprising the inner surface of said glass front panel and production process anomalies;

means for storing and processing images detected by said image recognition optical system to define sufficient points on said edges of said mask receiving surface in said plane for use by calculating means for computing coordinates of said points on said edges of said mask receiving surface to define the position of said edges of said mask receiving surface in said plane;

means for processing said stored images to compute the centroid of the contour of said images wherein said contour is an area bounded by the edges of the field-of-view of said solid state video cameras used in said image recognition optical system and said edges of said mask receiving surface detected by said image recognition optical system;

means for comparing the position of said computed centroid to a pre-established acceptable position of said computed centroid for acceptance or rejection of said image of said mask receiving surface and said mask receiving surface as being in a usable position in said plane;

means for computing coordinates of points on said path to be traced by said attachment device for affixing said mask to said mask receiving surface wherein said path is offset a predetermined amount from one edge of said computed position of said edge of said mask receiving surface such that all points on said path on said mask receiving surface are between the two edges of said mask receiving surface and wherein said path is computed for the entire perimeter of said mask receiving surface; and means for positioning said mask receiving surface within said plane, using said computed coordinates of said points on said path relative to the position of said attachment device, wherein said glass front panel with said support structure with said mask receiving surface is held in one of four positions of an indexing machine work table in proximity to a laser welding head mounted on an XY positioning system such that CNC computer controlled equipment causes a focused beam of said laser welding head to trace said path such that all welds produced by said focused laser beam are placed between the two edges of said mask receiving surface.

9. In the manufacture of a fixed tensed foil mask cathode ray tube which includes a glass front panel having a mask support structure on a planar inner surface thereof for receiving a foil mask, said support structure having a finished mask receiving surface, apparatus for detecting the position of said mask receiving surface on said support structure and for delineating a path to be traced by the focused beam of a laser welding head being part of a machine system for affixing a tensed foil shadow mask to said mask receiving surface, the method comprising:

loading said glass front panel having said support structure attached thereto with said support structure having a ground mask receiving surface, and a tensed foil shadow mask in a first of four work stations on a rotary table of said machine system;

indexing said rotary table to a second of said four work stations where said glass front panel with said support structure having a ground mask receiving surface is automatically transferred laterally to a position within the field-of-view of an array of eight video cameras at which position images are electronically stored for twelve contours representing twelve locations on said mask receiving surface, after which said rotary table indexes to a third position of said machine system for welding of said mask to said mask receiving surface and wherein subsequent to said laser welding of said mask to said mask receiving surface, said rotary table automatically indexes to a fourth position and the first position for unloading and repeating the cycle of said machine system;

detecting, within said plane, edges of said mask receiving surface, with said edges of said mask receiving surface being within the field-of-view of an image recognition optical system using eight solid state video cameras arrayed for simultaneous imaging of twelve contours of said mask receiving surface to define the position of twelve points on said edges of said mask receiving surface in said plane;

illuminating said twelve image areas in said plane of said mask receiving surface for enhancement of said twelve contour images to enable said eight video cameras to distinctly discriminate between said images of said mask receiving surface and background images comprising the inner surface of said glass front panel and production process anomalies;

storing and processing images detected by said image recognition optical system to define sufficient points on said edges of said mask receiving surface in said plane for use by calculating means for computing coordinates of said points on said edges of said mask receiving surface to define the position of said edges on said mask receiving surface in said plane;

selecting first in queue of a stored image contour for each of twelve detected contours and processing said selected stored image contour to compute the centroid of said selected image contour, wherein said selected image contour is an area bounded by the edges of the field-of-view of said solid state video camera used in said image recognition optical system and said edged of said mask receiving surface detected by said image recognition optical system;

comparing the position of said computed centroid to a pre-established acceptable position of said computed centroid for acceptance or rejection of said image of said mask receiving surface and said mask receiving surface as being in a usable position in said plane;

computing coordinates of points on said path to be traced by said attachment device for affixing said mask to said mask receiving surface wherein said path is offset a predetermined amount from one edge of said computed position of said edge of said mask receiving surface such that all points on said path on said mask receiving surface are between the two edges of said mask receiving surface and wherein a path is computed for the entire perimeter of said mask receiving surface; and positioning said mask receiving surface within said plane using said computer coordinates of said points on said path relative to the position of said attachment device, wherein said glass front panel with said support structure with said mask receiving surface is fixed in one of four positions of a machine work table in which said table indexes to a position in proximity to an XY positioning device on which is mounted a laser welding head wherein a series of mirrors direct the unfocused beam of a stationary laser to the input of said laser welding head and wherein said XY positioning device is operated by CNC computer controlled equipment causing the focused beam of said laser welding head to trace said path such that all welds produced by said focused laser beam are placed between the two edges of said mask receiving surface.

* * * * *